Sept. 22, 1959 L. LEWIN 2,904,963
DEVICE FOR THE CONTROL OF THE OPENING OF A GATE
Filed April 10, 1956 11 Sheets-Sheet 1

INVENTOR
LÉON LEWIN
BY Cameron, Kerkam & Sutton
ATTORNEYS

Sept. 22, 1959           L. LEWIN           2,904,963
DEVICE FOR THE CONTROL OF THE OPENING OF A GATE
Filed April 10, 1956           11 Sheets-Sheet 3

INVENTOR
LEON LEWIN
BY Cameron, Kerkam & Sutton
ATTORNEYS

Sept. 22, 1959             L. LEWIN             2,904,963

DEVICE FOR THE CONTROL OF THE OPENING OF A GATE

Filed April 10, 1956             11 Sheets-Sheet 5

INVENTOR

LÉON LEWIN

BY Cameron, Kerkam & Sutton

ATTORNEYS

Sept. 22, 1959 L. LEWIN 2,904,963
DEVICE FOR THE CONTROL OF THE OPENING OF A GATE
Filed April 10, 1956 11 Sheets-Sheet 6

Fig. 9

INVENTOR
LÉON LEWIN
BY Cameron, Kerkam & Sutton
ATTORNEYS

Sept. 22, 1959 L. LEWIN 2,904,963
DEVICE FOR THE CONTROL OF THE OPENING OF A GATE
Filed April 10, 1956 11 Sheets-Sheet 7

INVENTOR
LÉON LEWIN
BY Cameron, Kerkam & Sutton
ATTORNEYS

Sept. 22, 1959 L. LEWIN 2,904,963
DEVICE FOR THE CONTROL OF THE OPENING OF A GATE
Filed April 10, 1956 11 Sheets-Sheet 10

INVENTOR
LÉON LEWIN
BY Cameron, Kerkam + Sutton
ATTORNEYS

Sept. 22, 1959 L. LEWIN 2,904,963
DEVICE FOR THE CONTROL OF THE OPENING OF A GATE
Filed April 10, 1956 11 Sheets-Sheet 11

INVENTOR
LÉON LEWIN
BY Cameron, Kerkam & Sutton
ATTORNEYS

United States Patent Office 2,904,963
Patented Sept. 22, 1959

2,904,963

DEVICE FOR THE CONTROL OF THE OPENING OF A GATE

Léon Lewin, Saint-Etienne, France, assignor to Société des Forges et Ateliers du Creusot, Paris, France Application April 10, 1956, Serial No. 577,262

Claims priority, application France December 28, 1955

9 Claims. (Cl. 61—25)

The invention relates to the control of the opening of a sluice gate, and has in particular the object of providing a control device operating the gate in function of the magnitude of the level difference between the upstream and the downstream heads with respect to the gate.

One of the objects of the invention is to control the mass flow of the water passing underneath the gate, and others are to obtain a substantially constant mass flow notwithstanding the possible variations of the upstream and downstream levels.

Another object of the invention is to attain the regulation of the mass flow of the water by the aid of simple and robust mechanical members.

Another object of the invention is to have the possibility of modifying at will the mass flow of the water passing underneath the gate.

Another object of the invention is to maintain the control of the mass flow of the water whatever may be the condition of the current, whether torrential or not, on the downstream side immediately behind the gate.

Yet another object of the invention is to obviate exaggerated variations in the upstream level.

According to the invention, the control device for the opening of the sluice gate is characterised in that it comprises a channel branched off from a basin called upstream basin where the water is at the upper level with respect to the gate, a reception well receiving the water deriving from the said channel, a lateral opening provided in this reception well, these lateral openings having a profile calculated in such a manner that the level of the water in the well varies according to a predetermined law in function of the mass flow of the water deriving from the said channel, a control float disposed in the reception well, and a connection attaching the control float to the gate.

Other features and other objects of the invention will become clear from the following description of various embodiments of the device according to the invention.

The device represented in Figures 1 to 5 concerns the case where it is desired to assure a constant mass flow of water downstream of a segment shape gate.

It comprises an upstream sluice portion 1 and a segment-shape gate 2, perfectly balanced by a counterpoise 3. The gate 2 is mounted on an axle 4, and constitutes part of a circular cylinder the axis of which coincides with that of the axle 4, in such a manner that the thrust of the water does not set up a torque couple on the gate.

Figure 2:
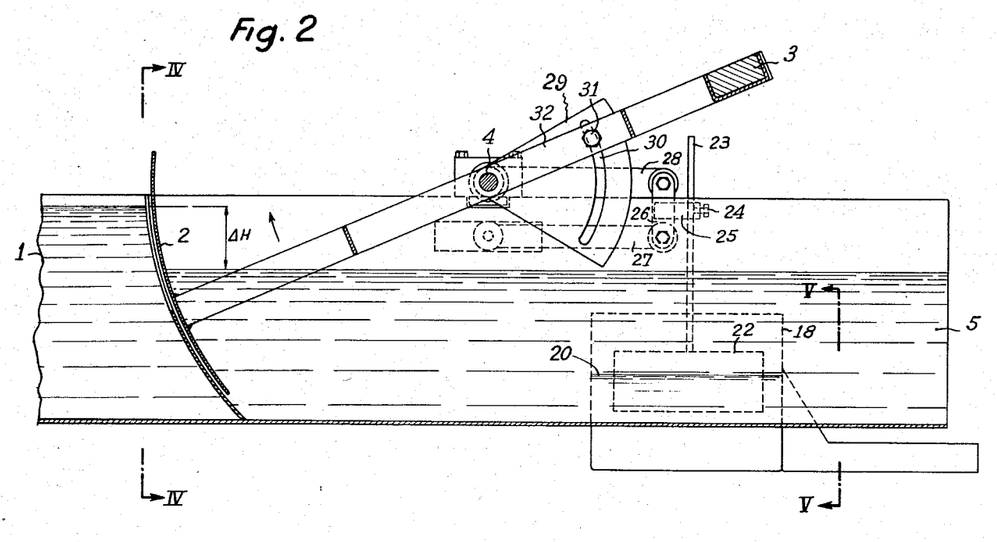
Figure 2 is a section along the line II—II of Figure 1.

The gate 2 is here illustrated in a raised position so that it allows a mass flow of water Q pass towards the downstream sluice portion 5, with a level difference $\Delta h$ between the upstream and the downstream head.

It is well known that in this case the mass flow Q is given by the formula $Q = m\Omega\sqrt{2g\Delta h}$, where $m$ is the mass flow coefficient depending inter alia on the opening of the segment-shape gate and $\Omega$ is the area of the cross section of the passage underneath the gate.

This formula shows that the mass flow of water Q is a function of $\sqrt{\Delta h}$. In order to maintain this mass flow constant, $\Omega$ had therefore to be varied in the sense opposite to $\sqrt{\Delta h}$, this is to say that the gate is to be raised when $\sqrt{\Delta h}$ decreases and vice versa.

Figure 1:
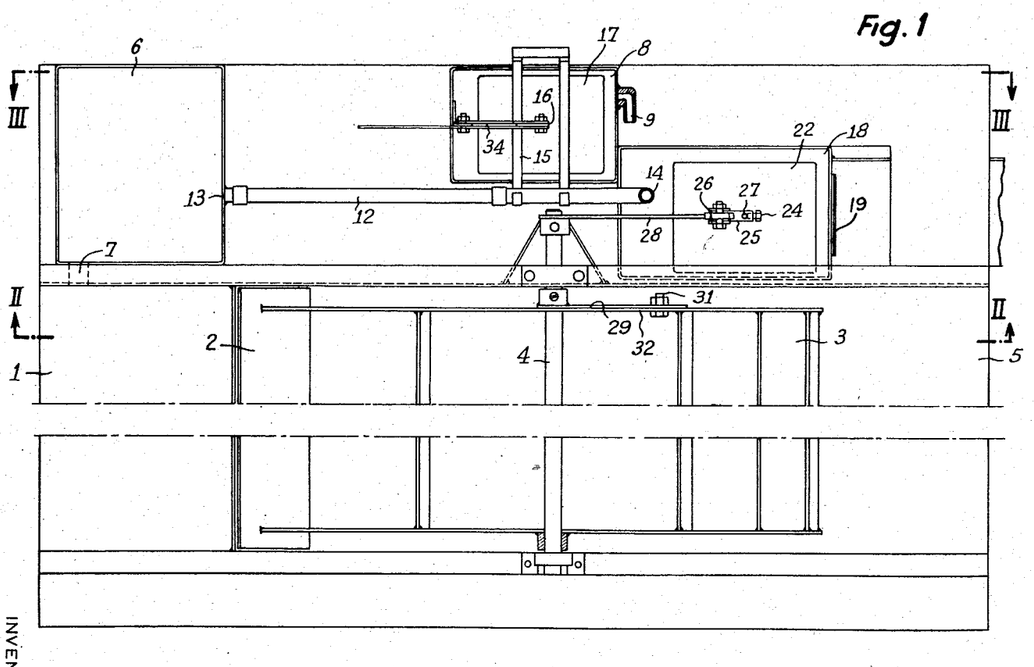
Figure 1 is a plan view of a device according to the invention.
Figure 3:
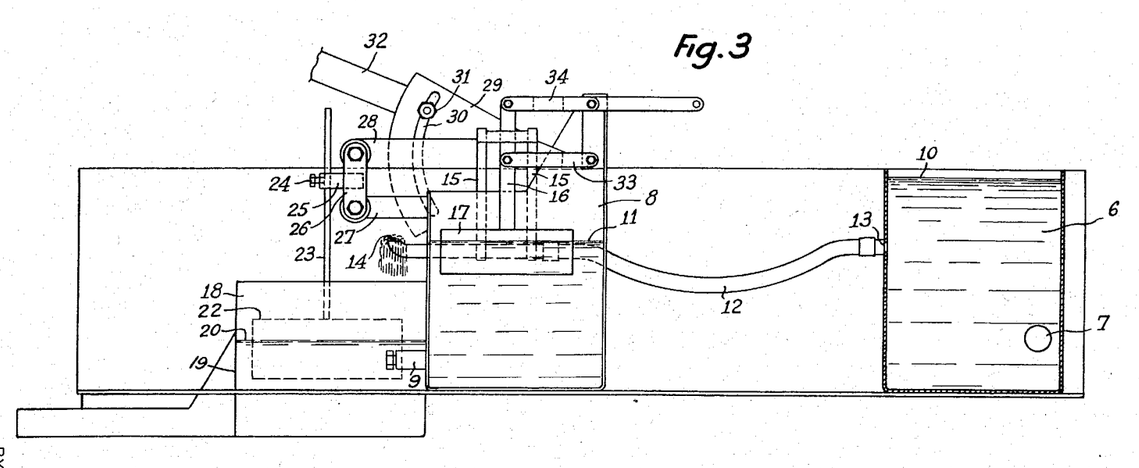
Figure 3 is a section along the line III—III of Figure 1.

According to the invention the device may comprise a reservoir 6 called the upstream basin in communication by a conduit 7 with the upstream sluice portion 1, and a reservoir 8 called the downstream basin in communication with the downstream sluice portion by means of a pipe (not shown) branched off at a nozzle 9. The reservoir 6 which plays the part of a decanter is not indispensable for the functioning of the device. The water level 10 in the reservoir 6 is therefore substantially the same as in the upstream sluice portion, and the water level 11 in the reservoir 8 is accordingly the same as in the downstream sluice portion.

A flexible duct 12 issues at 13 into the reservoir 6 and ends at its other extremity in an orifice 14 opening upwardly. The orifice 14 may offer a large area in such a manner that the thickness of the sheet of water overflowing is negligible with respect to $\Delta H$. This duct is supported by stirrups 15 fixed to a vertical rod 16 fixedly attached to a float 17 called the downstream float floating in the reservoir 8 in such a manner that the level of the orifice 14 is that of the water in the reservoir 8, this is to say in the downstream sluice portion. The level difference between the orifice 14 and the water level in the upstream sluice portion is accordingly equal to $\Delta H$.

It is well known that in these circumstances the mass flow of water $q$ flowing through the duct 12 is given by the formula $q = VS$, wherein V is the velocity of the water and S is the internal section area of the conduit. For a level difference of ΔH $$V=\frac{1}{A}\sqrt{2g\Delta h}$$

wherein A depends in a known manner on the coefficient of continuous friction in the general formula, on the diameter of the duct, on its length, and on the individual pressure drop coefficients. It is accordingly possible to calculate $$q=\frac{S}{A}\sqrt{2g\Delta h}$$

which may be written $q=B\sqrt{\Delta H}$ where B is a constant.

$q$ accordingly like Q (which in the case contemplated ought to be constant) is a function of ΔH and consequently tied up with Ω, the cross section area of the passage for the water underneath the gate.

This mass flow $q$ may accordingly be used either for the control or for the recording, or as in the case of the Figures 1 to 5, for maintaining the mass flow Q at a constant value.

For this latter purpose a well 18, called reception well is provided which receives the mass flow $q$, this well 18 comprises a lateral opening 19 assuring the flowing off of the mass flow $q$ of the liquid, and the establishing in the well of a predetermined level 20 for each mass flow through the duct 12.

It is easy to calculate the profile of the lateral opening 19 of the reception well 18 in such a manner that the level of the liquid in this well varies proportionally to the opening of the segment-shape gate. To this effect, the mass flow of the liquid flowing off from the well 18 through the opening 19 is given by the formula $$q_1=\mu\omega\sqrt{2gh}$$

wherein $\mu$ is the mass flow coefficient, $\omega$ is the cross section area of the passage, and $h$ is the height of this section. Since for a mass flow $q$ in the conduit 12 the level 20 of the water in the well 18 is determinate, the mass flow $q$ ought to be equal to the mass flow $q_1$, and as it has been seen on the other hand that in the case considered $q$ ought to be proportional to $\sqrt{\Delta H}$, the profile of the aperture 19 can be determined, this is to say the width of the aperture for each value of $h$, in order that the level 20 in the well 18 may vary proportionally to the opening of the segment-shape gate.

Figure 5:
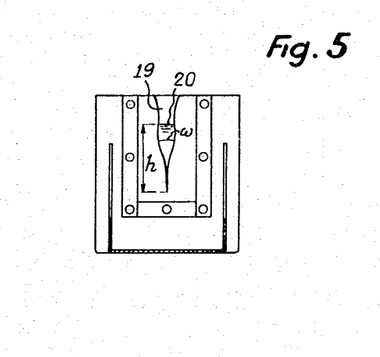
Figure 5 is a section along the line V—V of Figure 2.

In Figure 5 the aperture is illustrated as an angle flaring out upwardly.

In order to control the rising of the segment-shape gate 2 a float 22 called control float is used which floats on the well 18. This float carries a vertical rod 23 clamped by a screw 24 to a member 25 fixedly attached to a connecting rod 26 constituting one of the sides of an articulated parallelogram comprising two other connecting rods 27 and 28. The connecting rod 28 is fixedly attached to the axle 4 of the gate by the intermediary of a sector 29 which has a slot 30 in the shape of a circular arc coaxial to the axle 4 of the gate. The sector is traversed by a control screw bolt 31. This bolt 31, after having been tightened, assures the connection of an arm 32 of the gate 2 to the sector 29.

The float 22 may accordingly carry along the gate in order to maintain the mass flow Q constant. In order to modify at will (to regulate) the mass flow Q which ought to be kept constant, it suffices to unscrew the screw bolt 31 and to vary its position in the slot 30.

As will be seen in the drawing, the movements of the float 17 of the reservoir 8 may be likewise guided vertically by connecting rods 33 and 34 constituting two sides of an articulated parallelogram, a third side of this parallelogram being constituted by part of the rod 16.

The installation as described hereinabove assures automatically the mass flow Q. It should, however, be remarked that, when the mass flow value Q is changed at will, the cross section area is not changed proportionally to the variations of this mass flow Q. This derives from the fact that, as seen before, the mass flow Q is given by the formula $Q=m\Omega\sqrt{2g\Delta H}$ wherein the mass flow coefficient $m$ varies with the mass flow; it is therefore necessary to provide for Ω variations which are not proportional to the mass flow.

Figure 4:
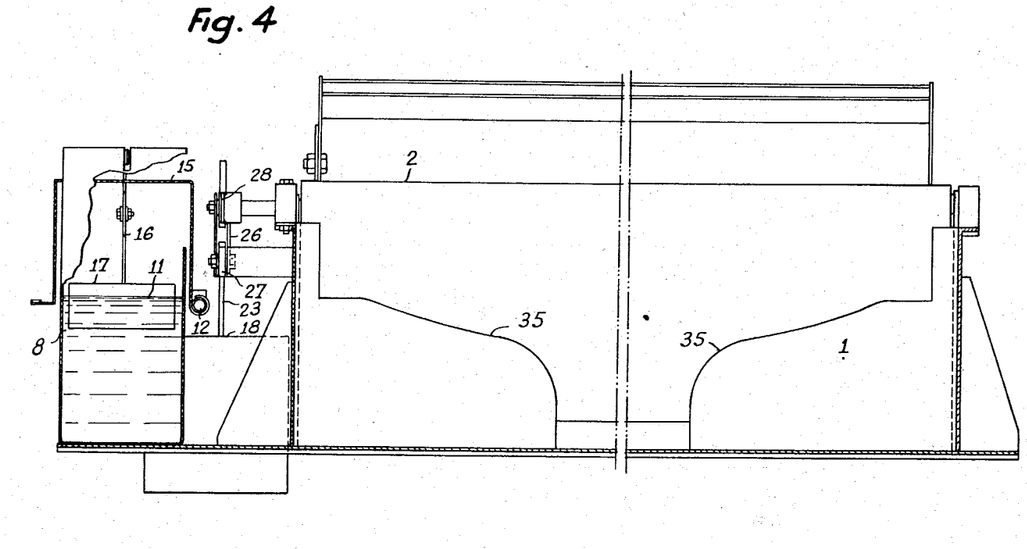
Figure 4 is a section along the line IV—IV of Figure 2.

One may for example, as illustrated in Figure 4, provide a non-rectangular profile 35 for the cross section of the upstream sluice portion 1. This profile may easily be determined by experience.

Figure 6:
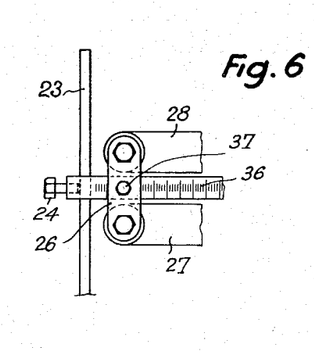
Figure 6 represents a modified embodiment concerning the control of a segment shape gate.

One may likewise adopt a rectangular profile but provide a particular device permitting to modify the distance between the axle 4 of the segment-shape gate 2 and the point of application of the forces exerted by the rod 23 of the float 22 for controlling the gate. Such a device is illustrated in Figure 6. In this case, the connecting rod 26 articulated to the connecting rods 27 and 28 is traversed by a graduated rod 36, and the position of the rod 36 in the connecting rod 26 can be fixed by means of a screw 37. This rod 36 carries the rod 23 of the float 22 to which it is attached by a screw 24.

When the mass flow Q is varied, the position of the rod 36 with respect to the connecting rod 26 is also to be varied with the aid of the graduations provided on the rod 36.

The device described with reference to Figures 1 to 6 comprises a flexible duct branched off from the portion of the upstream liquid level, and issuing at the downstream liquid level owing to a float resting on the downstream level and supporting the free end of the flexible duct.

This solution gives excellent results, provided, however, that the variations of the downstream level are not too large; for then the inclination of the flexible duct introduces a parasitic force which can not be neglected, and the accuracy of the functioning of the gate is reduced.

Figure 7:
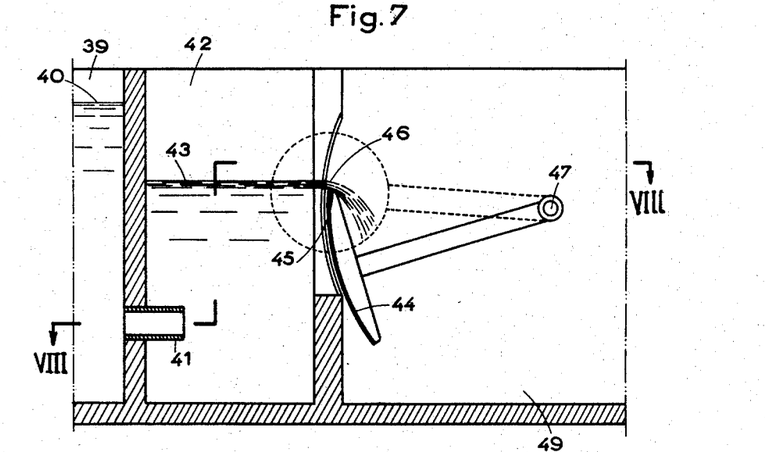
Figure 7 is a vertical section of a modification of the embodiment of device according to the invention, on a plane passing through the axis of the channel branched off from the upstream basin.
Figure 8:
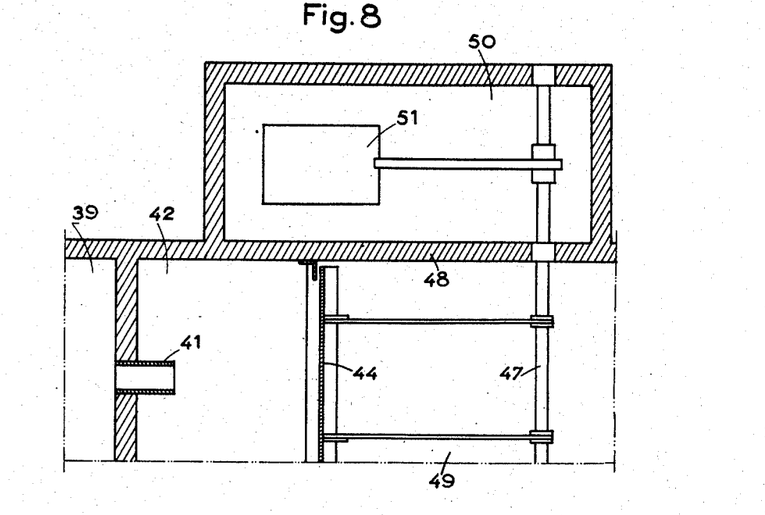
Figure 8 is a section along the line VIII—VIII of Figure 7.
Figure 9:
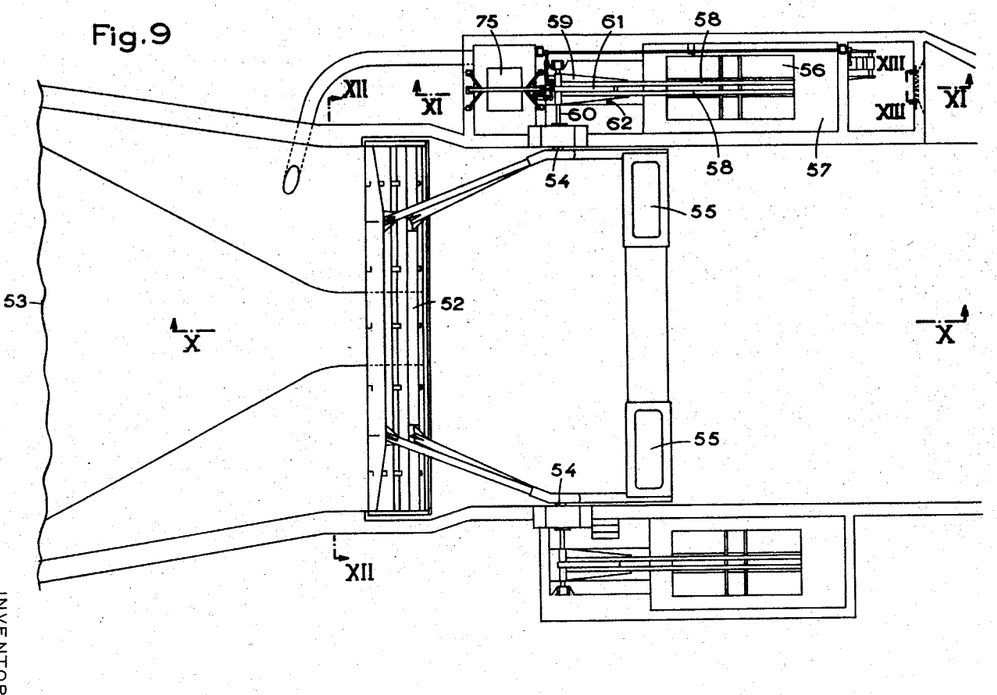
Figure 9 is a plan view of yet another modification of embodiment.
Figure 10:
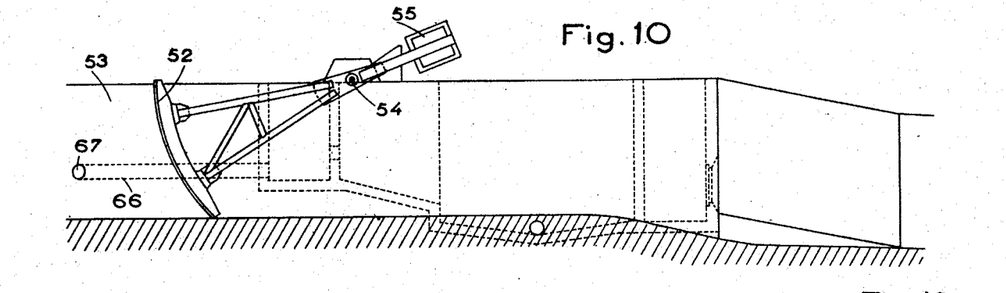
Figure 10 is a section on the line X—X of Figure 9.

Figures 7 and 8 illustrate a modified embodiment which does not offer the inconveniences which a flexible duct may have.

The installation illustrated partially in Figures 7 and 8 comprises an upstream basin 39 in communication with part of the water the level of which is that existing upstream of the gate the mass flow through which is to be controlled. This upstream level in the basin 39 is indicated at 40.

A fixed duct 41 is branched off from the lower portion of the basin 39 in such a manner that it is constantly below the upstream level 40. This duct 41 issues into an intermediate basin 42 wherein a level 43 must be maintained which is identical with the downstream level.

The duct 41 is moreover provided so that it is always situated below the downstream level 43. This duct is accordingly submerged at both its ends.

The basin 42 is closed by a small gate 44 the upper edge 45 of which forms an overflow. This upper edge 45 should be slightly below the downstream level which is to be established in the basin 42. The water overflows at 46 above the small gate 44 and its mass flow depends on the level difference between the upstream level 40 and the downstream level 43. The size of the small gate 44 is preferably dimensioned sufficiently large for the thickness variations of the overflowing sheet of water 46 to be very small with respect to the difference between the levels 40 and 43.

The control of the small gate 44 may be effected in a simple manner as indicated in the drawings. The axle 47 of the small gate may in fact pass through the wall 48 of the reception well 49 where the control float of the gate should be disposed, and penetrate into a basin 50 called downstream basin accommodating a float 51 called downstream float which floats on the liquid at the downstream level. A fixed duct (not shown) puts the basin 50 in communication with the downstream water with respect to the gate.

To the extent at which the downstream level varies, the float 51 rises or descends and controls the movements of the small gate 44 which assures a mass flow over the upper edge of the small gate which depends on the difference between the levels 40 and 43, whatever may be the magnitude of the variations in the downstream level.

When adjusting the installation it is necessary to take care that the upper edge 45 of the overflow gate 44 is at the downstream level 43 minus the thickness of the overflowing sheet of water 46.

The device illustrated in Figures 9 to 15 relates to another embodiment which comprises a segment-shape gate 52 obturating more or less the upstream sluice portion 53. The segment-shape gate is fixed on the axles 54 and is completely balanced by the counterpoises 55.

Figure 11:
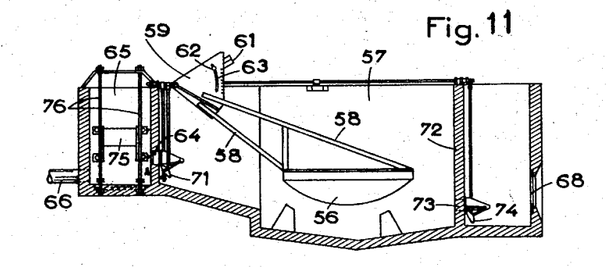
Figure 11 is a section on the line XI—XI of Figure 9.
Figure 12:
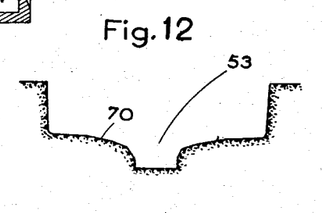
Figure 12 is a section on the line XII—XII of Figure 9.
Figure 13:
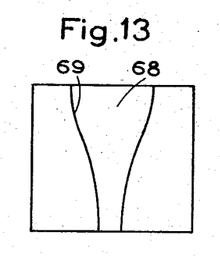
Figure 13 is a section on the line XIII—XIII of Figure 9.
Figure 14:
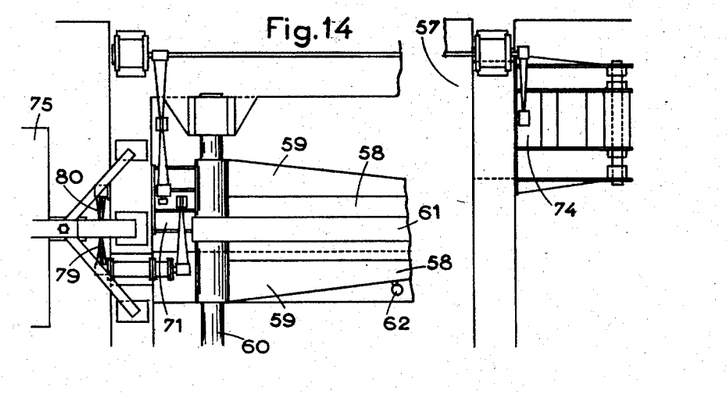
Figure 14 represents, on a larger scale and drawn nearer together, two portions of the plan view illustrated in Figure 9.
Figure 15:
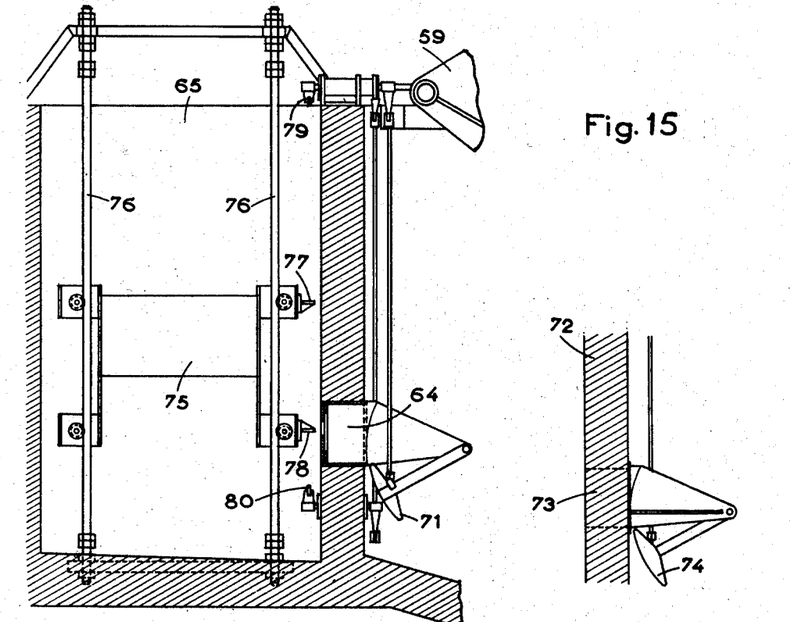
Figure 15 represents, on a larger scale and drawn nearer together, two portions of the section illustrated in Figure 11.

The opening or closing of the sluice by the gate is controlled by a control float 56 disposed in a reception well 57. This float is of cylindrical shape on its bottom as illustrated in Figure 11 in such a manner that its shape does not influence the opening of the gate in the course of a variation of the water level in the reception well 57.

The float 56 is fixedly attached to an arm 58 mounted on sectors 59. The sectors 59 may turn idly on an axle 60 which is fixedly connected to the pivot axle 54 of the gate. The connection between the sectors 59 and the axle 60, that is to say between the float 56 and the gate 52 is assured by an arm 61 keyed to the axle 60 which may be fixedly connected to the sectors 59 by means of a clamping device of any type the head 62 of which is represented in the Figures 9, 11 and 14, and which is mounted on a rod traversing a sector 59 by the aid of a slot 63.

The control float 56 may accordingly carry along the gate 52, and one may regulate at will the mass flow desired by modifying the position of the arm 61 with respect to the sectors 59.

In the case of the installation illustrated in Figures 9 to 15, the conditions of flow downstream of the gate are "torrential," this is to say the downstream level is exclusively a function of the aperture of the gate since then the downstream level is equal to the product by the coefficient of contraction of the vertical distance between the ground and the lower edge of the gate, this distance being called the aperture of the gate.

It can be shown easily that when a constant mass flow is desired, the aperture of the gate in the "torrential" state is exclusively a function of the head of the upstream level. In this case, the reception well 57 has only to be supplied by a duct 64 branched off from the basin 65 where the upstream level prevails. In the embodiment illustrated, the upstream basin is in communication with the upstream side of the gate by means of conduit 66 issuing into the sluice portion 53 by an orifice 67.

As in the preceding embodiments the reception well 57 is discharged by means of an overflow 68 the aperture of which has a predetermined profile 69.

The reception well 57 receives accordingly a mass flow of liquid derived, passing through the duct 64 under the resulting head of the water of the basin 65 the level of which is the same as that existing upstream of the gate.

The derived mass flow issuing from the duct 64 varies to the same extent as the variations of the upstream level, and therefrom results a variation of the water level in the reception well 57, and consequently a variation in the aperture of the gate.

It is possible to determine the profile 69 of the overflow 68 in the case where it is desired to obtain a constant level, in order that there may be proportionality between the water level in the reception well 57 and the aperture of the gate, this is to say the distance between the ground and the lower edge of the segment-shaped gate.

Definitely, when the pressure upstream of the gate varies, the aperture of the gate varies in the opposite sense, in such a manner that the mass flow passing underneath the segment shape gate 52 remains constant.

As before it will be possible to determine the cross-section 70 of the entrance portion of the sluice before the segment-shape gate in such a manner that the same mass flow may be automatically obtained in the course of the variations of the upstream level, whatever may be the mass flow to be adjusted for.

In the embodiment illustrated in Figures 9 to 15 there are likewise provided devices for the limitation of the opening or of the closing of the gate when the upstream level falls to a predetermined mark or rises until it reaches an emergency mark.

The principle of the limitation devices is based on the particular use made of the reception well 57.

In fact, when the conduit 64 is obturated, the well 57 discharges itself, and all this occurs as if the upstream level might drop completely. On the contrary, when the discharge through the overflow is obturated while the conduit 64 is left open, everything happens as if the upstream level would rise very rapidly.

In the first case the gate opens, in the second case it closes.

It is easy to provoke the movements indicated hereinabove by utilising on the one hand a small gate 71 for closing the conduit 64, and on the other hand closure 72 isolating the overflow 68 from the portion of the reception well comprising the float 56, this closure 72 being pierced by an orifice 73 adapted to be closed by a small gate 74.

The small gates 71 and 74 are operated by linkages actuated by a float 75 placed in the basin 65 where the water is at the upstream level. The float 75 is guided in its vertical movements by rods 76. It comprises upper and lower tenons 77 and 78, respectively, acting on a lever 79 controlling the small gate 71 and on a lever 80 controlling the small gate 74, respectively.

When the upstream level rises until the tenon 77 acts on the lever 79, the small gate 71 closes the conduit 64, the well 57 discharges itself, and the segment-shape gate 52 opens the entrance of the sluice. There is accordingly no risk of exceeding the emergency mark on the upstream side.

When on the contrary the upstream level drops until the tenon 78 acts on the lever 80, the small gate 74 closes, the well 57 fills up, and the segment-shape gate 52 closes. This prevents any running dry of the portion upstream with respect to the gate.

The installation described hereinabove with reference to the Figures 9 to 15 assure accordingly that a predetermined mass flow may be attained underneath the segment-shaped gate 52, and moreover that the upstream level does not vary more than between predetermined limits.

The embodiment illustrated in the Figures 16 to 19 has been devised so as to function whatever may be the condition of flow after the gate, whether "torrential" or not.

Figure 16:
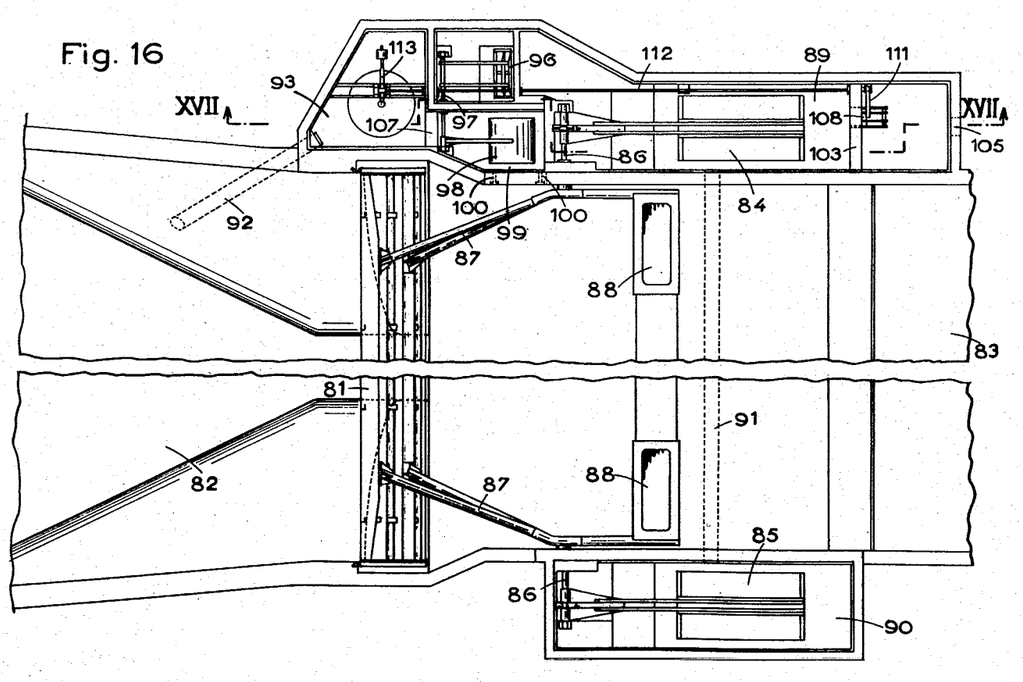
Figure 16 is a plan view of a last modified embodiment.
Figure 17:
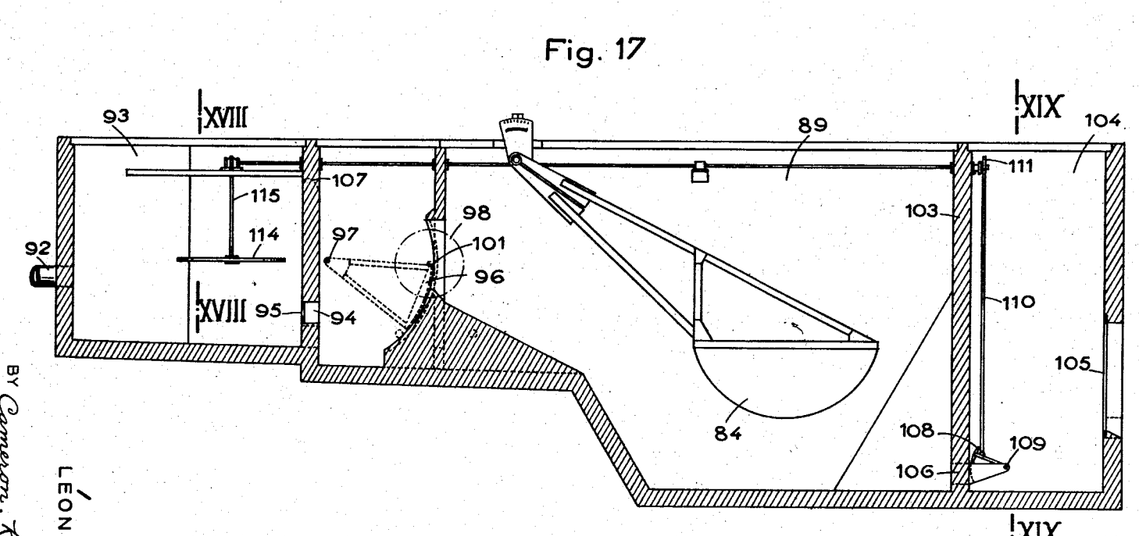
Figure 17 is a section on the XVII—XVII of Figure 16.
Figure 18:
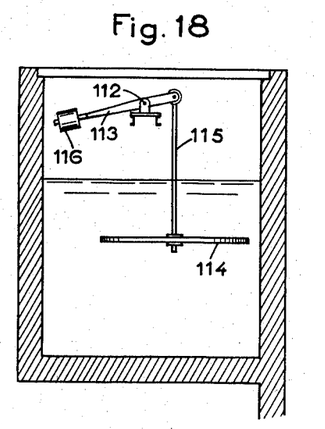
Figure 18 is a section on a larger scale along the line XVIII—XVIII of Figure 17.
Figure 19:
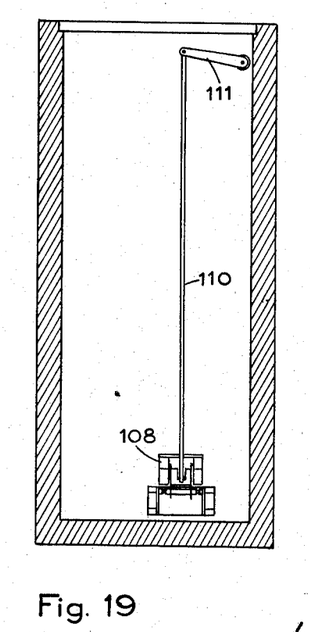
Figure 19 is a section on a larger scale along the line XIX—XIX of Figure 17.

The gate 81 which forms the limit between the upstream sluice portion 82 and the downstream sluice portion 83 is controlled by floats 84 and 85 driving axles 86 fixedly connected to arms 87 of the gate.

The gate is balanced by counterpoises 88.

The floats 84 and 85 are placed in the wells 89 and 90 put in communication with one another by a conduit 91.

In the following the well 89 will be referred to as the reception well, since it is the one which receives the water deriving from the upstream portion 82 of the sluice through an ancillary duct 92.

The installation comprises a basin 93 into which issues the duct 92. In this basin, the so-called upstream basin, the level is accordingly the same as the one prevailing upstream of the gate 81. This upstream basin 93 is in communication with the reception well 89 by the intermediary of an orifice 94 comprising a diaphragm of determinate aperture.

The reception well 89 comprises a small gate 96 the axle 97 of which is controlled by a float 98 disposed in a basin 99 called the downstream basin. This downstream basin 99 is in comunication with that section of the water which hereinafter will be referred to as the "control section," which is the section where the water level is the lowest immediately downstream of the gate.

The communication between the downstream basin 99 and the control section is established by the conduits 100 issuing below the free surface of the water in the downstream portion of the sluice.

Whatever may be the condition of the flow immediately downstream of the gate 81, whether "torrential" or not, the level in the basin 99 will always be the same as in the control section, owing to the conduits 100.

The float 93 and the conduits 100 which in reality are in front of the plane of section, are illustrated in Figure 7 in dotted lines.

As will be seen in Figure 17, the float 98 has the shape of a circular cylinder the axis of which is situated approximately in alignment with the upper edge 101 of the small gate 96.

The small gate 96 is keyed to an axle 97 in such a manner that its upper edge 101 is slightly below the level of the water in the downstream basin 99. In practice the level of the upper edge 101 should differ from the level of the downstream basin by the thickness of the overflowing sheet of water passing over the small gate.

It follows that the mass flow of the water passing over the upper edge 101 depends on the difference between the upstream level prevailing in the basin 93, and the level in the control section prevailing in the downstream basin 99.

This mass flow of water feeds, as in the preceding embodiments, the reception well where there is the float 84 controlling the gate.

The reception well 89 comprises moreover a well 103 disposed between the float 84 and the portion 104 of the well which has an opening 105 the profile of which is calculated in such a manner that the level of the water received by the well 89 varies according to a predetermined law. The wall 103 comprises an orifice 106 at its base, which may be closed by a small gate 108 pivotally mounted on an axle 109. The small gate 108 is controlled by a rod 110 articulated to a lever 111 which is keyed to a rod 112 which is fixedly connected to a lever 113 placed in the basin 93. When the lever 113 is rocked, it carries along in its rocking movement the rod 112, and operates accordingly the small gate 108.

At one end of the lever 113 a plate 114 is suspended by means of a rod 115. This plate 114 may for example consist of concrete. At the other end of the lever 113 a counterpoise 116 is placed which almost balances the weight of the plate 114 in the installation.

This installation functions in the following manner:

When the upstream level drops below a predetermined mark, the level drops simultaneously by the same magnitude in the basin 93, at the concrete slab 114 is lowered since it is no longer subject to the Archimedean buoyancy. The result is the closing of the orifice 106 by the small gate 108. The water level rises accordingly in the reception well 89, raising the float 84, which has the effect of closing the gate 81, and consequently preventing an exaggerated drop of the upstream level.

The upper limit of the upstream level is established on the other hand, in the case of the device illustrated in Figures 16 and 17, by an overflow 107 provided in the wall separating the upstream basin 93 from the downstream basin 99. The upper edge of this overflow is kept at a level ensuring that the upper limit of the upstream level may not be exceeded.

What I claim is:

1. Apparatus controlling the opening of a sluice gate as described including an upstream basin having a water level equal to that upstream of the gate, a duct leading from said basin, a well receiving water from said duct and having a lower water level than that in said basin, an aperture in said well extending vertically from adjacent its bottom to adjacent its top and having as its largest dimension its vertical dimension, a control float in said well and means for connecting said float and said gate, said aperture controlling the height of water in said well and the opening of said gate.

2. Apparatus as described in claim 1 in which said duct discharges into said well at a level above the water level in said well.

3. Apparatus as described in claim 1 including a downstream basin having a water level equal to that below said gate and a float in said downstream basin carrying the discharge end of said duct at substantially the water level below said gate, said duct being flexible to conform to changes in water level.

4. Apparatus as described in claim 1 in which said gate is of segment-shape and including a counterweight balancing said gate, said gate being connected to said control float.

5. Apparatus as described in claim 1 in which said gate is of segment-shape and including a rotatable axle mounting said gate, a counterweight balncing said gate on said axle, means for connecting said control float to said axle and means associated with said connecting means for adjusting the effective distance between said axle and said control float.

6. Apparatus controlling the opening of a sluice gate as described including an upstream basin having a water level equal to that upstream of said gate, a duct leading from said basin, a well receiving water from said duct and having a lower water level than that in said basin, a vertically extending lateral aperture in said well, a control float in said well, means connecting said float and said gate, an intermediate basin, an intermediate gate between said intermediate basin and said well determining the water level in said intermediate basin, a downstream basin having a water level equal to that below said gate, a float in said downstream basin and means actuated by said last named float for positioning said intermediate gate to provide the same water level in said intermediate basin as in said downstream basin.

7. Apparatus as described in claim 6 including a control section immediately downstream from said gate and having the lowest water level immediately below said gate and at least one conduit between said downstream basin and said control section said conduit opening into said control section below the surface of the water therein.

8. Apparatus as described in claim 6 including an overflow between said upstream basin and said downstream basin at a predetermined height for maximum upstream water level.

9. Apparatus as described in claim 6 including a wall in said well adjacent said lateral aperture, a normally open orifice in said well, a gate for closing said orifice, a float in said upstream basin and means for connecting said last named float and said last named gate to close said gate when the water level and said last named float drop in said upstream basin.

References Cited in the file of this patent

UNITED STATES PATENTS 2,802,363    Ponsar _______________ Aug. 13, 1957

FOREIGN PATENTS 548,215    France _______________ Oct. 14, 1922
139,909    Austria _______________ Dec. 27, 1934
1,080,677    France _______________ June 2, 1954
928,940    Germany _____________ June 16, 1955